(12) United States Patent
Isidore

(10) Patent No.: US 8,947,698 B2
(45) Date of Patent: Feb. 3, 2015

(54) MOVING A PORTION OF A PRINT JOB FROM ONE PRINTER QUEUE TO ANOTHER PRINTER QUEUE

(76) Inventor: Eustace Prince Isidore, Austin, TX (US)

(*) Notice: Subject to any disclaimer, the term of this patent is extended or adjusted under 35 U.S.C. 154(b) by 172 days.

(21) Appl. No.: 12/907,988

(22) Filed: Oct. 19, 2010

(65) Prior Publication Data

US 2012/0092702 A1 Apr. 19, 2012

(51) Int. Cl.
*G06F 3/12* (2006.01)

(52) U.S. Cl.
CPC ............ *G06F 3/1285* (2013.01); *G06F 3/1204* (2013.01); *G06F 3/126* (2013.01)
USPC ........................................................ 358/1.15

(58) Field of Classification Search
CPC ...................................................... G06F 3/126
USPC ........................................................ 358/1.15
See application file for complete search history.

(56) References Cited

U.S. PATENT DOCUMENTS

| | | | |
|---|---|---|---|
| 5,978,559 A * | 11/1999 | Quinion | 358/1.15 |
| 2006/0221359 A1* | 10/2006 | Mokuya | 358/1.1 |
| 2007/0146772 A1* | 6/2007 | Castellani | 358/1.15 |
| 2007/0180082 A1* | 8/2007 | Abraham et al. | 709/223 |
| 2007/0229883 A1* | 10/2007 | Fujimori et al. | 358/1.15 |
| 2007/0245354 A1* | 10/2007 | Tomita | 719/318 |
| 2008/0180725 A1* | 7/2008 | Levin | 358/1.15 |
| 2008/0225326 A1* | 9/2008 | Kephart et al. | 358/1.15 |
| 2009/0273802 A1* | 11/2009 | Kajiyama | 358/1.15 |
| 2012/0050754 A1* | 3/2012 | Fredlund et al. | 358/1.9 |

* cited by examiner

*Primary Examiner* — Eric A Rust
(74) *Attorney, Agent, or Firm* — Isidore PLLC

(57) ABSTRACT

One or more methods, systems and computer program products enables selectable management and queuing of print jobs across multiple available printers available to a device generating the print job. One or more embodiments present a smart print queue with document level view and printer-level transfer of queued print jobs.

14 Claims, 10 Drawing Sheets

Slide area across/down
page to view content

Vertical/Horizontal Scroll

MOVING A PORTION OF A PRINT JOB FROM ONE PRINTER QUEUE TO ANOTHER PRINTER QUEUE

PRIORITY CLAIM

The present invention claims priority from U.S. Provisional Application, Ser. No. 61/253,033, filed on Oct. 19, 2009. The entire content of that provisional application is incorporated herein by reference.

BACKGROUND OF THE INVENTION

1. Field of the Invention

Embodiments of the present invention relate generally to electronic printers and in particular to electronic printers utilized with data processing devices. Still more particularly, embodiments of the present invention relate to a printer device utility for selectable management of print jobs.

2. Description of the Related Art

In today's personal and business computing environment, it is not uncommon for a single computer to support printing to multiple different printers that are installed on the particular computer device (or associated server of the device). With these systems, each of the printer devices are connected to the computer as an individual device to which a print job can be sent, independent of the other printers that can be installed on the particular computer. The user selects the specific printer to which a particular print job is being scheduled before the print job is issued, and the specific printer prints the print job when/if connected to the computer or print server network. Once the print job is sent to the printer, the print job can either be allowed to complete on the specific printer or can be cancelled prior to completion.

BRIEF DESCRIPTION OF THE DRAWINGS

The following description of the illustrative embodiments of the invention are described with reference to the drawings, in which like numbers represent the same or similar elements, as follows.

DETAILED DESCRIPTION OF ILLUSTRATIVE EMBODIMENTS

Figure 1:
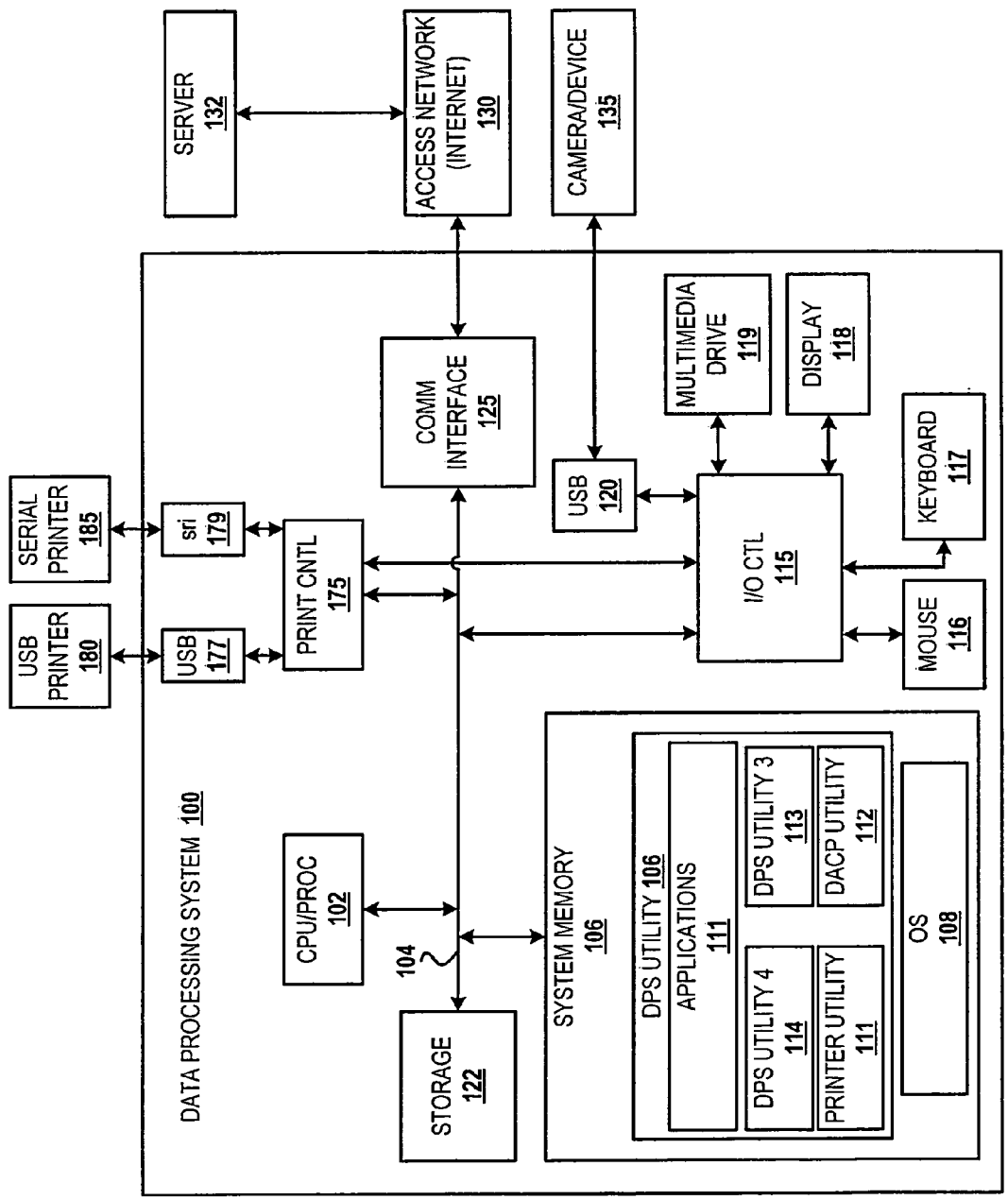
FIG. 1 illustrates an example data processing system and associated hardware and software utility, which may be utilized to implement one or more embodiments of the described inventions.
Figure 2:
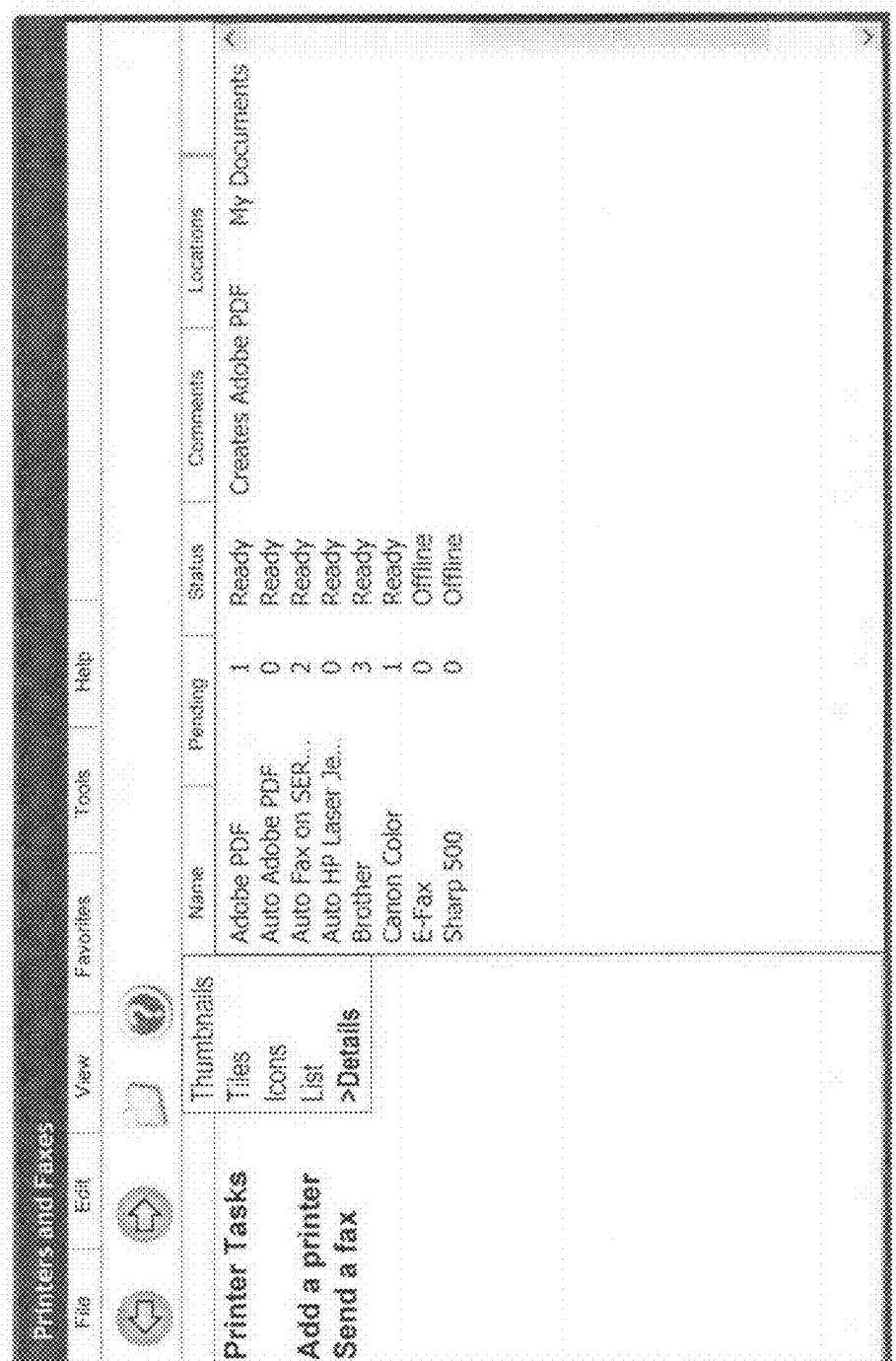
FIGS. 2-6 are a sequence of graphical user interfaces (GUIs) of a printer controller application/utility illustrating various functions of selectably changing/moving a print job from one printer to another via user selection, in accordance with several embodiments.
Figure 3A:
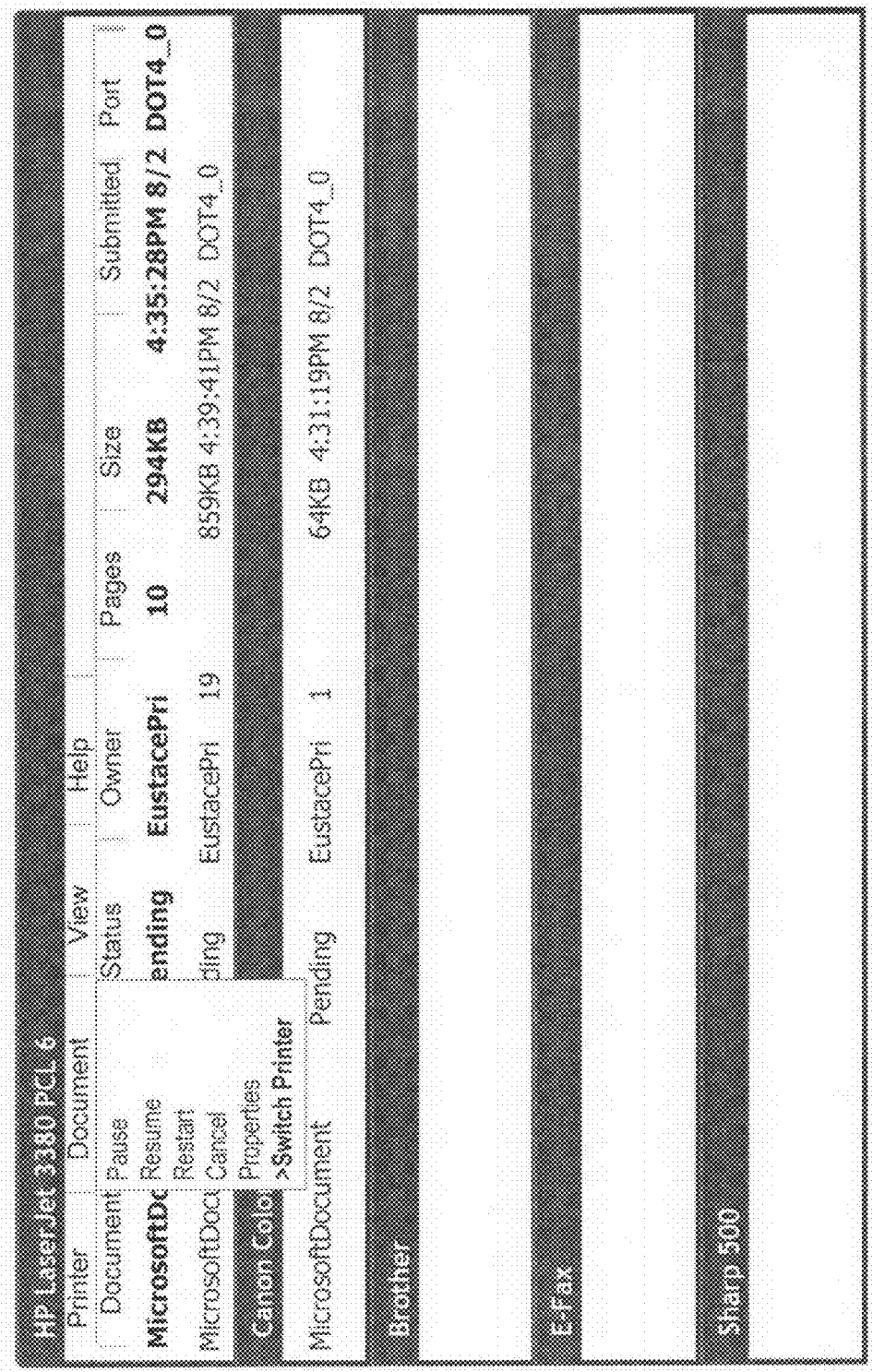
Figure 3B:
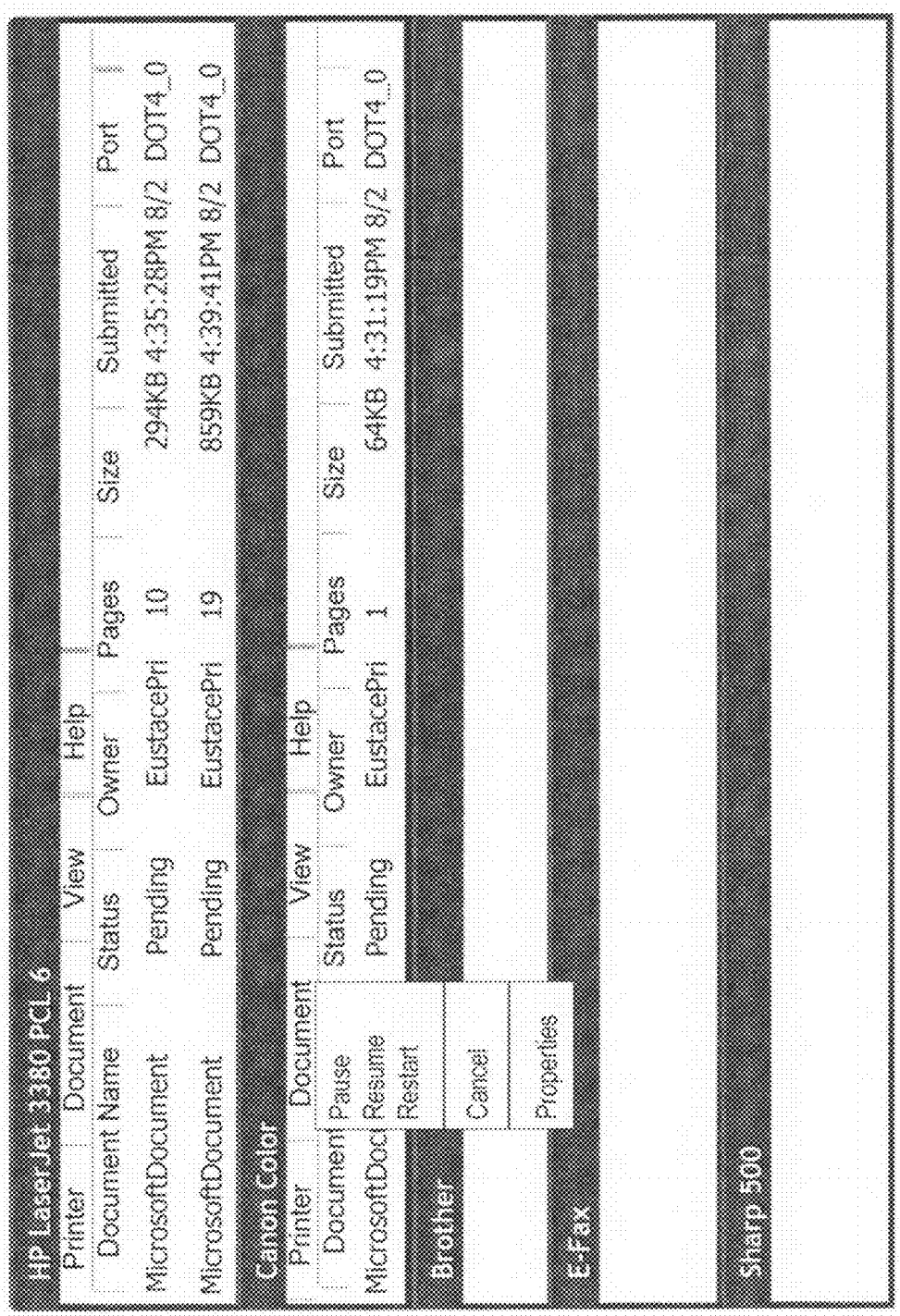
Figure 4:
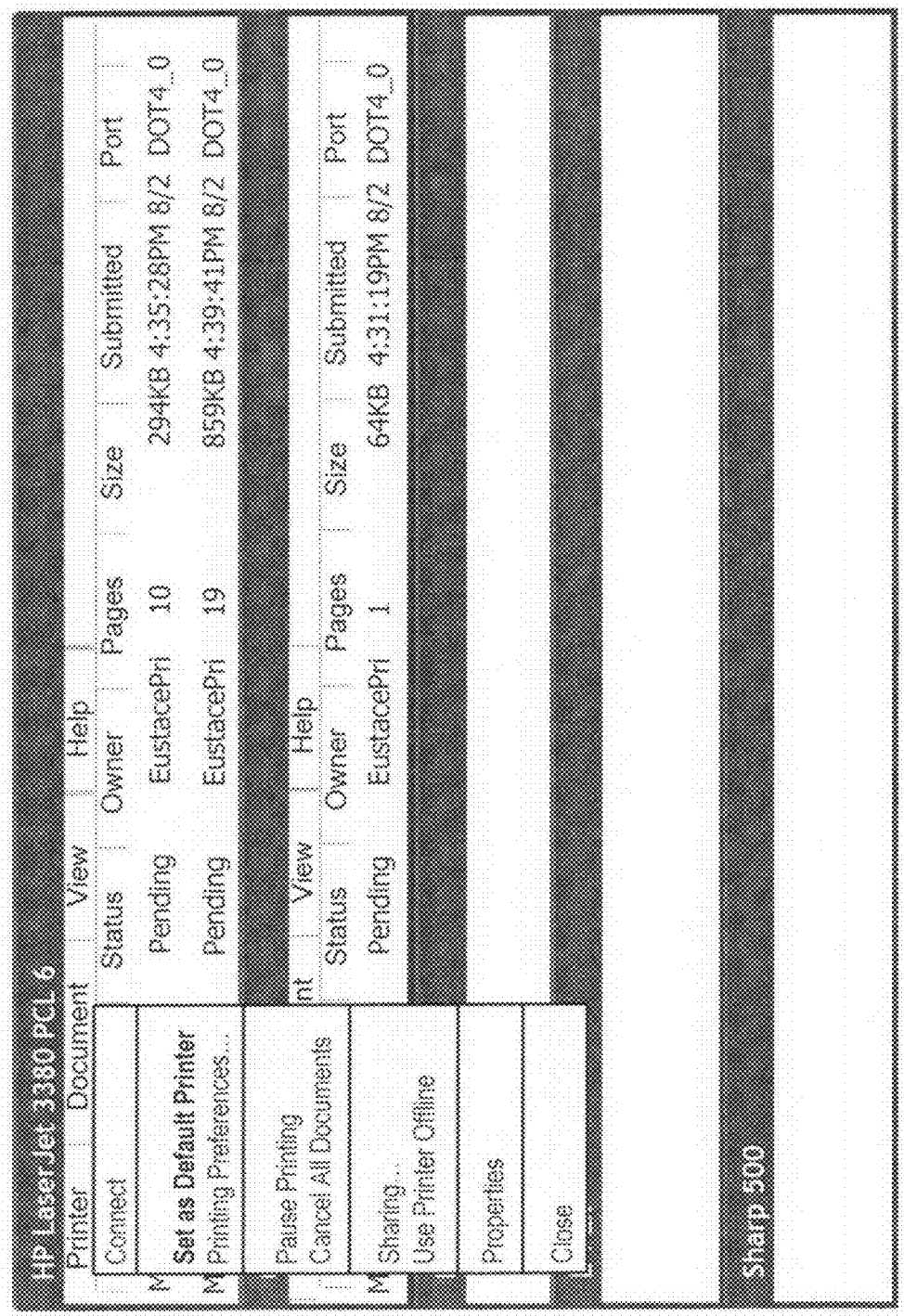
Figure 5:
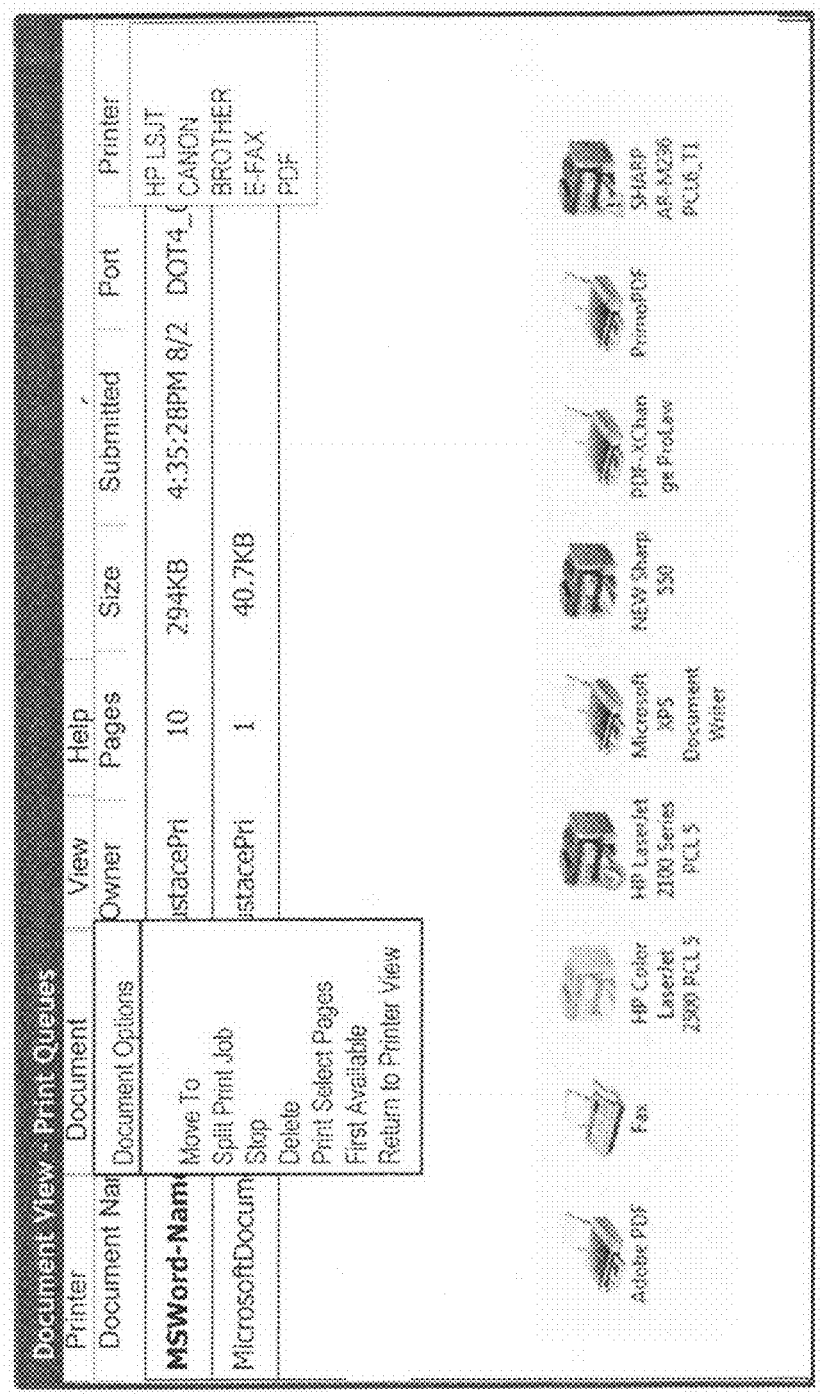
Figure 6:
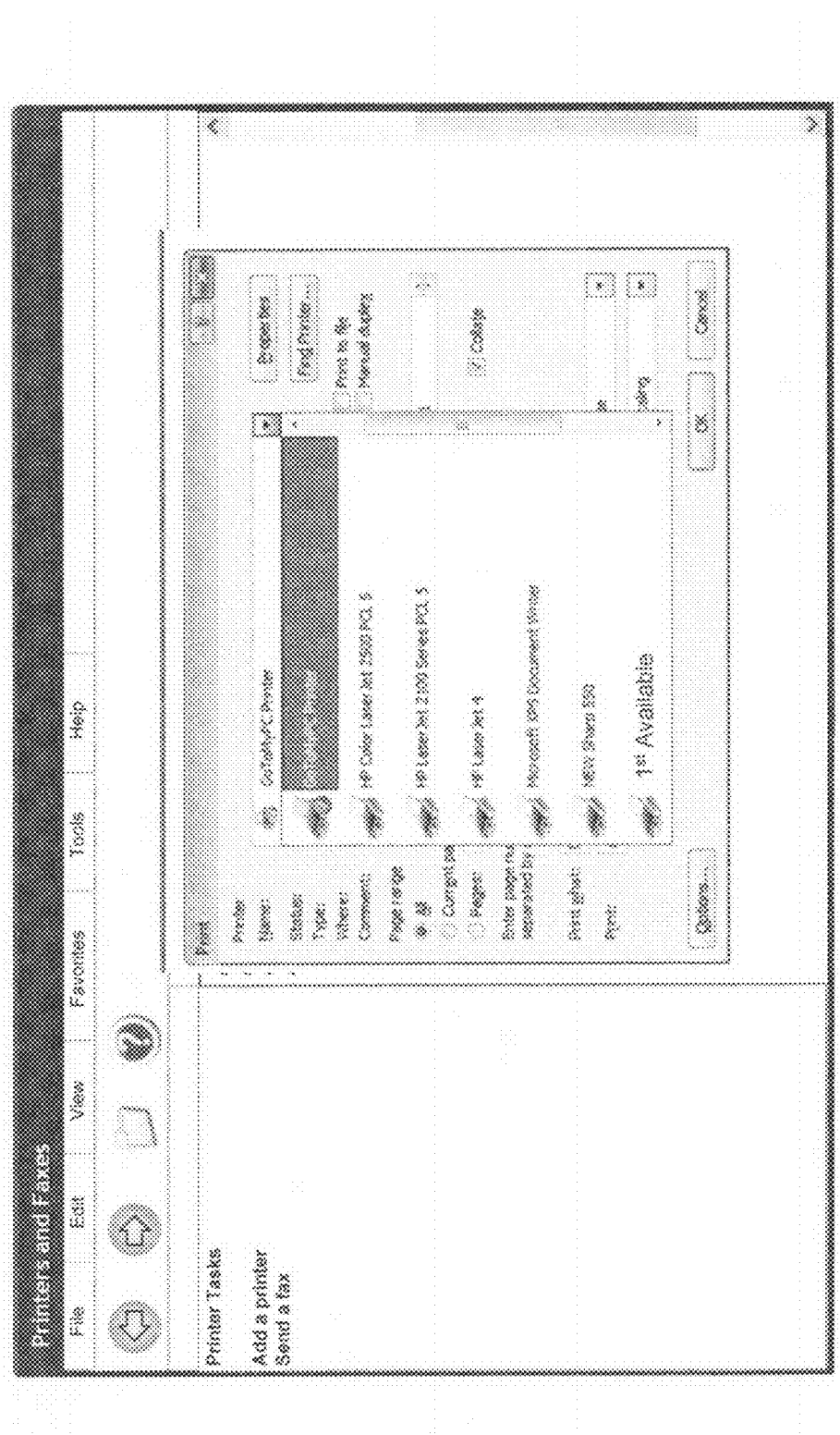

Generally, the illustrative and described embodiments provide one or more methods, systems and computer program products for enabling selectable management and queuing of print jobs across multiple available printers available to a device generating the print job. One or more embodiments present a smart print queue with document level view and printer-level transfer of queued print jobs.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element can be provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

With reference now to the figures, and beginning with FIG. 1, there is depicted a block diagram representation of an example data processing system (DPS), within which one or more of the described functional features can be implemented. DPS 100 may be a computer, a portable device, such as a personal digital assistant (PDA), a smart phone, and/or other types of electronic devices that may generally be considered processing devices. As illustrated, DPS 100 comprises at least one processor or central processing unit (CPU) 102 connected to system memory 106 via system interconnect/bus 104. Also connected to system bus 104 is input/output (I/O) controller 115, which provides connectivity and control for input devices, of which pointing device (or mouse) 116 and keyboard 117 are illustrated. I/O controller 115 also provides connectivity and control for output devices, of which display 118 is illustrated. Additionally, a multimedia drive 119 (e.g., compact disk read/write (CDRW) or digital video disk (DVD) drive) and USB (universal serial bus) port 120 are illustrated, coupled to I/O controller 115. Multimedia drive 119 and USB port 120 enable insertion of a removable storage device (e.g., optical disk, scan disk (SD) or "thumb" drive) on which data/instructions/code, including multimedia data, may be stored and/or from which such data/instructions/code may be retrieved. In one embodiment, DPS may comprise a separate multimedia storage drive utilized for removable insertion of a storage device such as a computer storage medium on which executable program code/instructions may be stored and executed by a processor (CPU 102) in one embodiment. DPS 100 also comprises storage 122, within/from which data/instructions/code may also be stored/retrieved. DPS 100 is also illustrated with a network interface device (NID) 125, by which DPS 100 may connect to one or more remote servers 132 via one or more access/external networks 130, of which the Internet is provided as one example.

DPS 100 also comprises a print controller 175 to which a plurality of different types of printers may be coupled via a USB connector 177 or serial printer port 179. Two such printers are illustrated, labeled Printer1 180 and Printer2 185. Printer1 180 connects to DPS 100 and specifically to print controller 175 via USB connector 177, while Printer2 185 connects to DPS 100 via serial printer port 179. Documents generated by one or more applications executing on DPS 100 or documents downloaded from an external source, perhaps via access network 130 may be sent to print on one or both printers, according to one embodiment. In one embodiment, additional virtual printers can be installed on DPS 100. For example, DPS may include an Adobe printer that is utilized to generate/print a PDF document. Further, the specific order of printing and printers assigned to each print job issued may be modified after the print job is queued, as described in greater detail below.

In addition to the above described hardware components of DPS 100, various features of the invention are completed/supported via software (or firmware) code or logic stored within memory 106 or other storage (e.g., storage 122) and executed by CPU 102. Thus, for example, illustrated within memory 106 are a number of software/firmware/logic components, including applications 107, operating system (OS) 108 (e.g., Microsoft Windows® or Windows Mobile®, trademarks of Microsoft Corp, or GNU®/Linux®, registered trademarks of the Free Software Foundation and The Linux Mark Institute). In addition to the applications 107 and OS 108, DPS 100 further comprises one or more DPS printer firmware/utility (or print driver) 111 and Document level print queue control (DLPC) utility 112. In actual implementation and for simplicity in the following descriptions, DLPC utility 112 can be a component within either print driver 111 or within the OS 108. DLPC utility 112 represents one or more software modules, which may provide a single executable component, which provides the various functions of each individual software component/module/utility when the corresponding combined code of the executable component is executed by CPU 101. Where appropriate to the description, DLPC utility 112 may be illustrated and described as a standalone or separate software/firmware component/module, which provides specific functions, as described below. As a standalone component/module, DLPC utility 112 may be acquired as an off-the-shelf or after-market or downloadable enhancement to an existing program/application/OS/utility/firmware, such as a print driver that is provided by the manufacturer of the printer device. In at least one implementation, DPS utility 112 may be downloaded from a server or website and installed on DPS 100 or executed directly from the server (132).

CPU 101 executes DLPC utility 112 as well as OS 108, which supports the user interface features of DPS utility 110, such as generation of a graphical user interface (GUI), where GUI generation is supported/provided by DLPC utility 112. In the described embodiment, DLPC utility 112 generates/provides one or more GUIs to enable user interaction with, or manipulation of, functional features of DLPC utility 110.

Certain of the functions supported and/or provided by DLPC utility 110 are enabled as processing logic (or code) executing on DSP/processor 102 and/or other device hardware, which processing logic completes the implementation of those function(s). Among the software code/instructions/logic provided by DLPC utility 110, and which are specific to the described embodiments of the invention, are code/logic for performing/implementing one or more of the following: (a) a smart print queue with document level view and printer-level transfer of queued print jobs; (b. These features/functionalities are described in greater detail below along with the description of the various figures.

Those of ordinary skill in the art will appreciate that the hardware components and/or basic configuration depicted in FIG. 1 (and the configurations depicted within other figures presented herein) may vary, depending on implementation. The illustrative components within these figures (e.g., DPS 100) are provided solely for illustration and are not intended to be exhaustive, but rather are representative to highlight essential components that are utilized to implement one or more embodiments of the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system. Depending on the embodiment, it is understood that the functions of the invention may be applicable to other types of communication devices and that the illustration of DPS 110 and description thereof as a specialized device is provided solely for illustration. For example, DPS 110 may be a mobile phone, personal digital assistant (PDA), a Blackberry™, an Ipod®, iPhone®, or other similar potable device with the functionality to support DPS and DLPC utility based features.

Selectable Management of Print Queue

With reference now to the specific figures associated with the different embodiments described herein. FIG. 2, FIGS. 2-6 are a sequence of graphical user interfaces (GUIs) of a printer controller application/utility illustrating various functions of changing a print job from one printer to another via software manipulation, in accordance with several embodiments. In a first embodiment, the control window of printers and faxes is enhanced/modified to enable in document level view of queued print jobs, in addition to the printer level view provided with conventional systems. When a document is sent to print, the printer selection window provides a selection for "first available", which enables the documents to be printed on the printer that is first connected/made available for printing from the computer device. Thus rather than having to select a specific printer to print the document, the user is allowed the option of simply printing on the first printer to which a computer is connected. Where one or more printers are currently connected to the computer device, the first available option automatically selects the default printer that is previously established on the computer device. From the printer window, a first view provides a list of each printer with the number of queued documents for that printer indicated in a column next to the printer ID. Using a drop-down menu option, the first few may be changed to a second view in which each of the queued documents are indicated in the primary list, with the associated printer and other associated features provided in adjacent columns next to the document ID/name. With this document level view, the document may be selected and then reassigned to a different printer from the printer to which the document was previously set for printing. One methodology for complete industry assignments provides for a drive and drop functionality by which this document name is highlighted/selected and dragged onto the icon of the printer. In this embodiment the icons for each of the printers/faxes are displayed within the document view window.

In one embodiment, selected pages of a queued document within the document level view may be forwarded for printing to a different printer from other pages of the queued documents. Thus the document level view also provides the functionality of splitting a print job amongst multiple printers after the job has been forwarded to the print queue. Plus, for example very last print job can be allocated amongst multiple different printer is based on the availability of the different printer as is determined from the document level view. In one body meant the utility which provides the document level view of personality inserts a plurality of selectable options from a drop-down top menu, such as document options, or documents. Among the selectable options may be one or more of: moved to, split print job, print selected pages, first available, and returned to printer level view. In one expanded embodiments, the list of printers are provided in an open window to the side of the application and/or on the desktop, and the utility enables a tried and drop functionality for documents, images, and the like to be transferred from a directory level and you documents/images directly onto a printer for printing.

Figure 7:
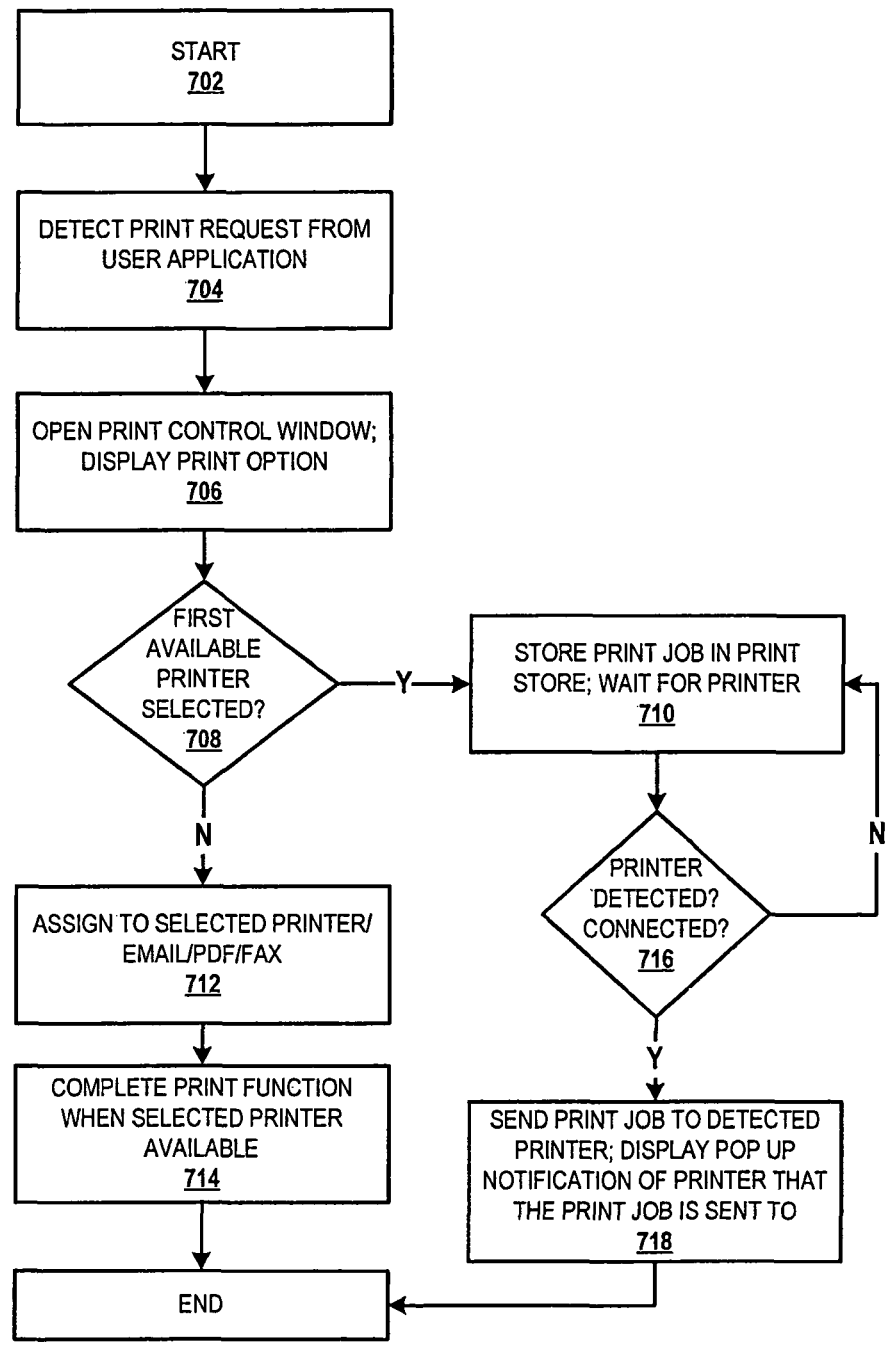
FIGS. 7 and 8 are flow charts illustrating the methods by which queued print jobs may be moved from a first printer to another printer, according to one or more described embodiments.
Figure 8:
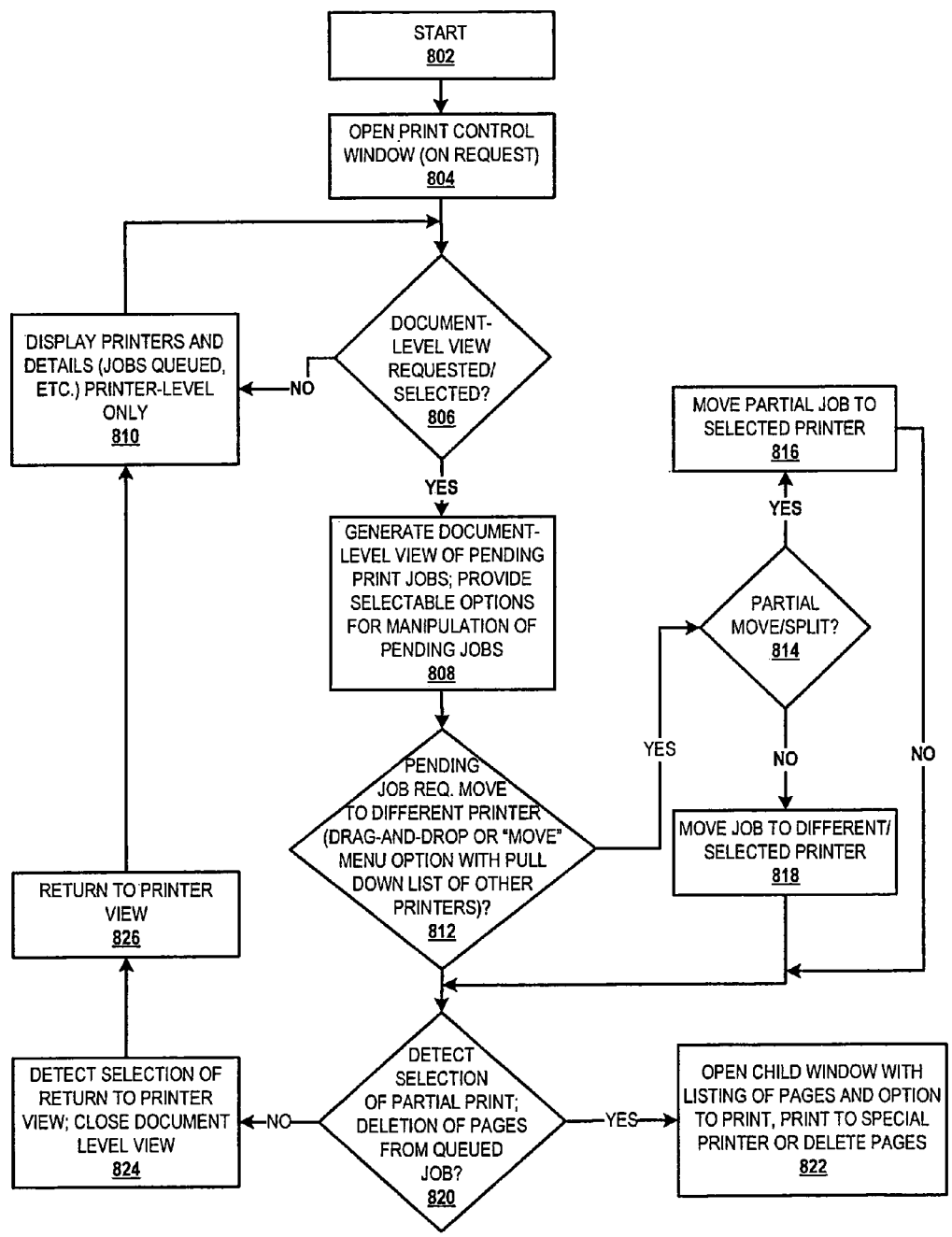
Figure 9A:
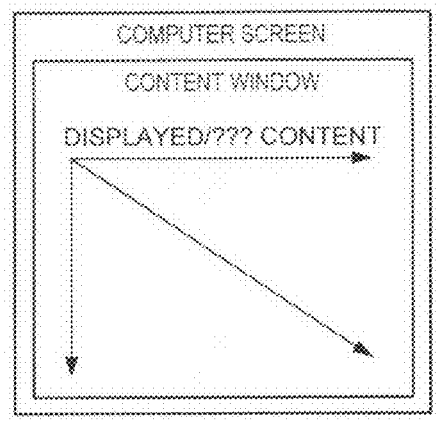
FIGS. 9A-9E illustrate a computer monitor with user interface blocked for privacy based on a viewing screen scrolling through content as the content is being viewed in the device.
Figure 9B:
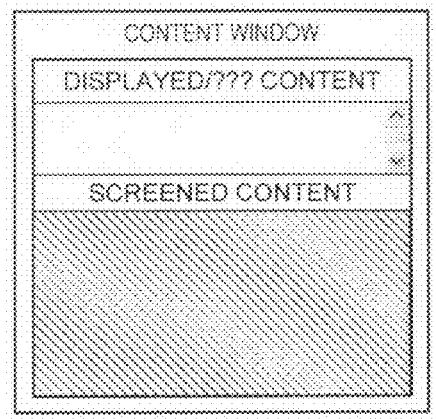
Figure 9C:
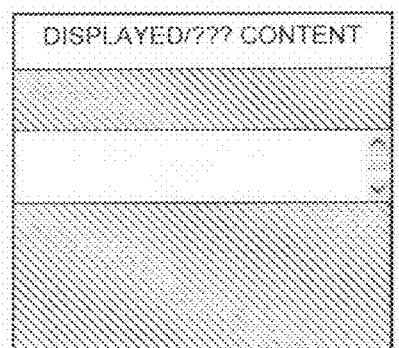
Figure 9D:
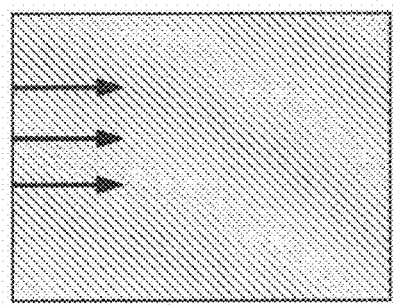
Figure 9E:
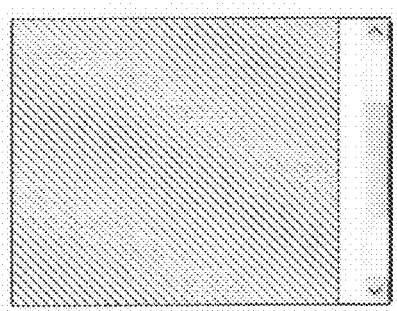

FIGS. 7 and 8 are flow charts illustrating the methods by which queued print jobs or sections thereof may be moved from a first printer to another printer, according to one or more described embodiments. The method of FIG. 7 begins at intiator block 702 and proceeds to block 704 at which the utility detects selection of a first printer from a user application. The utility opens up the print control window and displays within that print control window the various printer options that are (currently) available (block 706). If the first available printer is selected, as determined at decision block 708, the print job is stored within the print store queue for that specific first printer (block 710). When the connection to the printer is later detected (connecting the installed but not physically connected printer), as determined at block 712, the OS/utility enables the print driver to send the print job to the detected printer for printing thereon (block 714). Additionally, a pop up window may be generated in one embodiment with a notification that the print job was sent to a specific printer. The process then ends at block 720.

Returning to decision block 708, when the first available printer is not selected, the utility receives an assignment/selection of a specific printer to which the print job is to be sent (block 716). The utility enables the OS to complete the printing operation of the print job once the selected printer is or becomes available (block 718).

Referring now to the method of FIG. 8, which commences at block 802 before proceeding to block 804. At block 804, a request is detected/received by the DLPC utility 112 to open the print controller window. The utility causes the OS to open the print controller window. A determination is made at block 806 whether a request is received (from external user inputs, in one embodiment) to present the document level view option. If the document level view is not selected, then printing occurs according to standard printing, and the printers and their corresponding job queues are displayed within the controller window (block 808). In response to the utility detecting the document level view entry/selection, the utility triggers the OS to generate a document-level view of all pending print jobs (block 810). When document level view is requested within the controller window at block 806, the utility triggers the OS to provide a set of novel selectable options to enable manipulation of the pending (queued) print jobs (block 808). These selectable options are available within the document level view of a print controller GUI/window. At block 812, a determination is made whether the utility detects/receives a request to complete a move of a pending job (that is queued for a first printer to complete) from the first printer to a second printer of the available/installed printers. In one embodiment, this movement of a document from one printer to another can be completed via a drag and drop function (after first highlighting/selecting the document within the controller window in document-level view). IN another embodiment, a move menu option is presented from a pull down or expanded list of printers and printer options. The pull down list may be generated by a mouse right click of the specific document while in the document level view mode. The list may include each of the available/installed printers to which the document is to be queued at for completion of the print operation. In one or more embodiments, the move of the queued print job can be a partial move of some of the print job (for large print jobs, for example) whereby the selection may be for the earlier or latter part of the document or for specific pages (e.g., move pages 5-15 of a 20 page document) of the document to be printed by a newly assigned/selected printer. A determination is made at block 814 of whether the move is a partial move. In response to the move being a partial move, the specific portion of the queued document is moved to the next selected printer (e.g., printer 2) (block 816). When a full/complete move of the document is requested, the utility triggers the OS to move the entire print job (for that specific document) to the selected second/next printer (block 818). At block 820 a decision is made whether a selective print of a partial job or a partial delete of a queued job is detected. When one of these advanced options is detected, a second child window is opened on the display and the utility presents a listing of the pages of the queued document for selection (block 822). The user of the computer can then select a partial print to a particular select printer, deletion of certain pages of the document from the print job, and other functions that are granularly implemented. At block 824 the utility detects selection of the printer view option and responds by closing the document level view window (block 824). At block 826, the utility then triggers the OS to present the print view screen listing the printers and the number of jobs queued to each printer, if any. Toggling back and forth between the respective views is thus supported within the printer controller window.

(2) Built in Wireless Phone Device in a Computer System (Seamless Integration Via Secure Coupling of Wireless Communication Device within a Physically Mobile Environment/Device)

According to one embodiment, an example mobile computing and communication device comprises a portable notebook with built in, removable wireless phone (mobile communication device) with a locking mechanism and shared memory support, in accordance with one embodiment. Simply stated, a computer system is designed with a built in wireless telephone device which a user of the computer system may conduct wireless phone calls as well as connected to a wireless telephone network for data transmission. The telephone device is located within the chassis of the computer device, and the buttons with client for interfacing with the phone device are provided as the same buttons on the keyboard of the computing device. In one embodiment additional buttons are provided supporting other functionality of the phone device. A user is thus able to carry both his laptop computer in his phone as a single device that is sufficiently large to enable the computing functionality to be performed without issues. A Bluetooth wireless earpiece and/or a wired microphone and speaker may be provided to enable this phone to be used privately. In one embodiment the speaker and microphone on the computer device may be utilized to conduct the telephone's voice communication.

In one embodiment, a special locking mechanism is provided that enables the removable phone to be securely locked in place in the casing of the notebook. As one extension to this embodiment, the mobile communication device may be configured to only operate with the particular notebook so that the mobile device must be docketed to the notebook at some periodic interval to enable the mobile communication device to continue providing one or more functions programmed within the mobile communication device. Other security mechanisms includes: (a) requiring a password entry on the mobile device or on the notebook to unlock the mobile device from the notebook, once the lock is engaged; (b) enabling Bluetooth of RFID security checking of the mobile device without requiring the device be docked to the notebook, so that the device functions remain operational so long as the device is within communication range of the notebook, unless an override security code is entered to allow the mobile device usage as a truly remote communication device (separate from the notebook); (c) shared contacts list that enables access to the mobile device contacts only when within the vicinity of the notebook; (d) shared memory functions related to mobile device computing and or notebook communication requiring the two devices be communicatively connected at some point.

The physical location of the mobile communication device is optional and may provide for a numeric keypad for the notebook or a monitor or screen for the notebook. In one embodiment, the screen of the communication device is re-created on the notebook monitor to enable the user of the notebook to see incoming calls and view information on the communication device as a window of the notebook, when the mobile device is coupled or within communication reach of the notebook.

In one embodiment, mobile computing functionality is actually supported by the notebook via some Internet based (or wireless service provider based) phone system, such as Vonage®. The mobile computing device is then removed from the notebook but within a communication distance of the notebook, and so long as the notebook is connected to the Internet, calls may be originated and terminated at the mobile communication device via the notebook-supported phone service.

One expanded embodiment provides seamless integration via secure coupling of a wireless communication device, such as a cell phone or Blackberry® within physically mobile environment. The physically mobile environment may be a motor vehicle or a motorcycle or a notebook computer as described above. The seamless integration may involve security functionality such as automatic text to voice receiving and voice-only texting functions when the mobile communication device is secured to the mobile environment. Features and functionalities of these embodiments further provide for: (a) a secure latching mechanism to prevent theft of the mobile communication device; code based unlocking or un-tethering of the coupling between devices; (c) direct connectivity to the speakers and microphone built into the environment and default switch over to the speaker and microphone of the environment when coupled; (d) Bluetooth® or other RF mechanism interfacing; (e) use of the 3G broadband functionality of the mobile communication device to enable Internet access to navigation functionality and interactive navigation using maps software independent of GPS functionality; and (f) actual use of the mobile computing device as a GPS device with environment speakers as output module for spoken directions.

In the various flow charts above, one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the methods' steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, SRAM, DRAM, Flash memory, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media, include recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

While the invention has been particularly shown and described with reference to a preferred embodiment, it will be understood by those skilled in the art that various changes in form and detail may be made therein without departing from the spirit and scope of the invention.

What is claimed is:

1. In a data processing system having a plurality of installed or available printers for printing of one or more generated print jobs, a computer implemented method comprising:
in response to receiving a first individual print job with a selection of a first printer for completion, queuing the first individual print job for completion at the first printer, wherein the first individual print job is a single document and the single document is assigned to the first printer for completion, independent of a printer allocation of other single documents;
visually presenting, within a printer controller window, a selectable menu option having a plurality of printer options, including a printer level view and a document level view in which each of the queued documents are indicated in a primary list, with an associated printer and other associated features provided in adjacent columns next to the document indicators;
in response to a selection of the document level view within the selectable menu option of the printer controller window to a printer level view, displaying a document-level view within the printer controller window, wherein the document level view provides the listing of queued documents and enables movement and manipulation of the queued documents across the multiple available/installed printers in response to one or more different inputs supported by one or more selectable options enabled within the document-level view, and wherein the document level view of queued print jobs is different from and provided in addition to a printer level view that shows the listing of printers and corresponding printer statuses;
wherein displaying a document-level view further comprises:
opening and displaying a drop-down menu option having a selectable option that enables a change from the printer level view to the document level view; and
toggling between respective ones of the document level view and the printer level view based on selections received within the drop down menu option of the printer controller window; and
in response to receiving a selection to move at least a portion of the first individual print job, while the first individual print job is pending within a first print queue of the first printer and before the first individual print job has completed on the first printer, moving the at least the portion of the first individual print job from the first print queue to a second print queue of a second printer, whereby the at least the portion of the first individual print job is printed on the second printer and any remaining portion of the first individual print job is printed on the first printer.

2. The method of claim 1, wherein the moving of the first print job comprises:
performing a partial move of the first individual print job responsive to receiving a selection of one or more specific components of the first individual print job that are less than a total amount of granularly-identifiable components of the first individual print job to move to the second print queue, wherein the individual first print job is a single print job of a single document;
wherein a granular component-level move is provided within separately identifiable components of the first individual print job.

3. A computer program product comprising: a computer readable storage device; and
program code on the computer readable storage device that when executed on a data processing device performs the functions of claim 1.

4. The method of claim 1, further comprising:
in response to a document being sent to print, displaying an option for user selection within a printer selection window of "first available", which selection enables documents to be printed on the printer that is first made available for printing from a computer device; and
in response to receipt of the user selection of "first available" identifying, from among the plurality of available printers, a printer that is a first printer that is able to complete the printing of the document and automatically routing the document to the printer.

5. The method of claim 4, further comprising:
automatically selecting a default printer that is previously established on the computer device as the first available printer, in response to more than one printer being currently connected and available to the computer device when the first available option is selected.

6. The method of claim 4, further comprising:
in response to detecting a later connection of the first available printer, sending the print job to the detected printer for printing thereon; and
generating a notification within a pop up window indicating to which specific printer the print job was sent.

7. The method of Claim 1, wherein displaying a document-level view further comprises:
enabling a document to be selected and then reassigned to a different printer from the printer to which the document was previously assigned for printing.

8. The method of claim 7, wherein enabling the document to be selected and then reassigned comprises:
detecting a drag and drop operation involving the document which begins by a selection of the document at a location of a first assigned printer and ends at the different printer, wherein the document identifier is selected and dragged onto an icon of the printer, where icons for each of the printers and faxes are displayed within a document level view window; and
automatically re-assigning the selected document to the different printer for printing of the selected document.

9. The method of claim 7, further comprising:
presenting a list of printers in an open window to one of (a) a side of an open application and (b) on a desktop user interface;
enabling a drag and drop functionality for documents and images from a document directory level directly onto a specific printer for printing; and
in response to detecting a drag and drop of a selected document or image from the document directory level onto a printer icon, placing a copy of the selected document or image into a queue of a corresponding printer to enable printing of the selected document.

10. The method of claim 7, further comprising:
displaying a plurality of selectable options from a drop-down top menu within a printer selections window, wherein the selectable options include multiple options from among: move document to a next printer, split print job among multiple printers, select specific pages of a pending document within a printer queue to print, print to first available printer, and return printer selections window to printer level view; and
in response to receipt of a selection of one option from the selectable options, performing the one option selected.

11. The method of claim 1, further comprising:
in response to detecting a selection within the print window of a document level view:
generating the document-level view of all pending print jobs; and
providing a set of novel selectable options within a print controller graphical user interface (GUI) to enable manipulation of the pending print jobs.

12. The method of claim 11, further comprising:
generating and displaying a "move" menu option within one of a pull down list and an expanded list of printers and printer options;
in response to receiving a selection for moving of specific pages of a queued single document to be printed by a next selected printer: determining whether the move is a partial move; and in response to the move being a partial move, moving only the specific pages of the queued single document to the next selected printer.

13. In a data processing system having a plurality of installed or available printers for printing of one or more generated print jobs, a computer implemented method comprising:
in response to receiving a first individual print job with a selection of a first printer for completion, queuing the first individual print job for completion at the first printer;
visually presenting, within a printer controller window, a selectable menu option having a plurality of printer options, including a printer level view and a document level view in which each of the queued documents are indicated in a primary list, with an associated printer and other associated features provided in adjacent columns next to the document indicators;
in response to a selection of the document level view within the selectable menu option of the printer controller window to a printer level view, displaying a document-level view within the printer controller window, wherein the document level view provides the listing of queued documents and enables movement and manipulation of the queued documents across the multiple available/installed printers in response to one or more different inputs supported by one or more selectable options enabled within the document-level view, and wherein the document level view of queued print jobs is different from and provided in addition to a printer level view that shows the listing of printers and corresponding printer statuses;
wherein displaying a document-level view further comprises:
opening and displaying a drop-down menu option having a selectable option that enables a change from the printer level view to the document level view; and
toggling between respective ones of the document level view and the printer level view based on selections received within the drop down menu option of the printer controller window;
in response to receiving a selection to move at least a portion of the first individual print job, while the first individual print job is pending within a first print queue of the first printer, moving the at least the portion of the first individual print job from the first print queue to a second print queue of a second printer before the first individual print job has completed on the first printer, whereby the at least the portion of the first individual print job is printed on the second printer; and in response to receipt of a request to delete only a portion of a single print job that is queued within a first individual print queue, performing a partial deletion of one or more components of the first individual print job corresponding to the portion, while one or more remaining components of the first individual print job are left within the first print queue for printing, wherein a granular component-level deletion is enabled for separately identifiable portions of the single first print job.

14. In a data processing system having a plurality of installed or available printers for printing of one or more generated print jobs, a computer implemented method comprising:
visually presenting, within a printer controller window, a selectable menu option having a plurality of printer options, including a printer level view and a document level view in which each of multiple queued documents are indicated in a primary list, with an associated printer and other associated features provided in adjacent columns next to the document indicators;
in response to a selection of the document level view within the selectable menu option of the printer controller window to a printer level view, displaying a document- level view within the printer controller window, wherein the document level view provides the listing of queued documents and enables movement and manipulation of the queued documents across the multiple available/installed printers in response to one or more different inputs supported by one or more selectable options enabled within the document-level view, and wherein the document level view of queued print jobs is different from and provided in addition to a printer level view that shows the listing of printers and corresponding printer statuses, wherein displaying a document-level view further comprises:
opening and displaying a drop-down menu option having a selectable option that enables a change from the printer level view to the document level view; and
toggling between respective ones of the document level view and the printer level view based on selections received within the drop down menu option of the printer controller window;
in response to receiving a first individual print job with a selection of a first printer for completion, queuing the first individual print job for completion at the first printer;
in response to receiving a selection to move at least a portion of the first individual print job, while the first individual print job is pending within a first print queue of the first printer, moving the at least the portion of the first individual print job from the first print queue to a second print queue of a second printer before the first individual print job has completed on the first printer, whereby the at least the portion of the first individual print job is printed on the second printer;
in response to detecting a partial delete request of a queued single job, opening a child window on the display and presenting a listing of the pages of the queued first individual print job to receive a selection of specific pages for deletion; and
enabling selection from within the child window of one of (a) a partial print to a particular select printer of specific pages selected, and (b) deletion of the specific pages selected of the document from the print job.

* * * * *